UNITED STATES PATENT OFFICE.

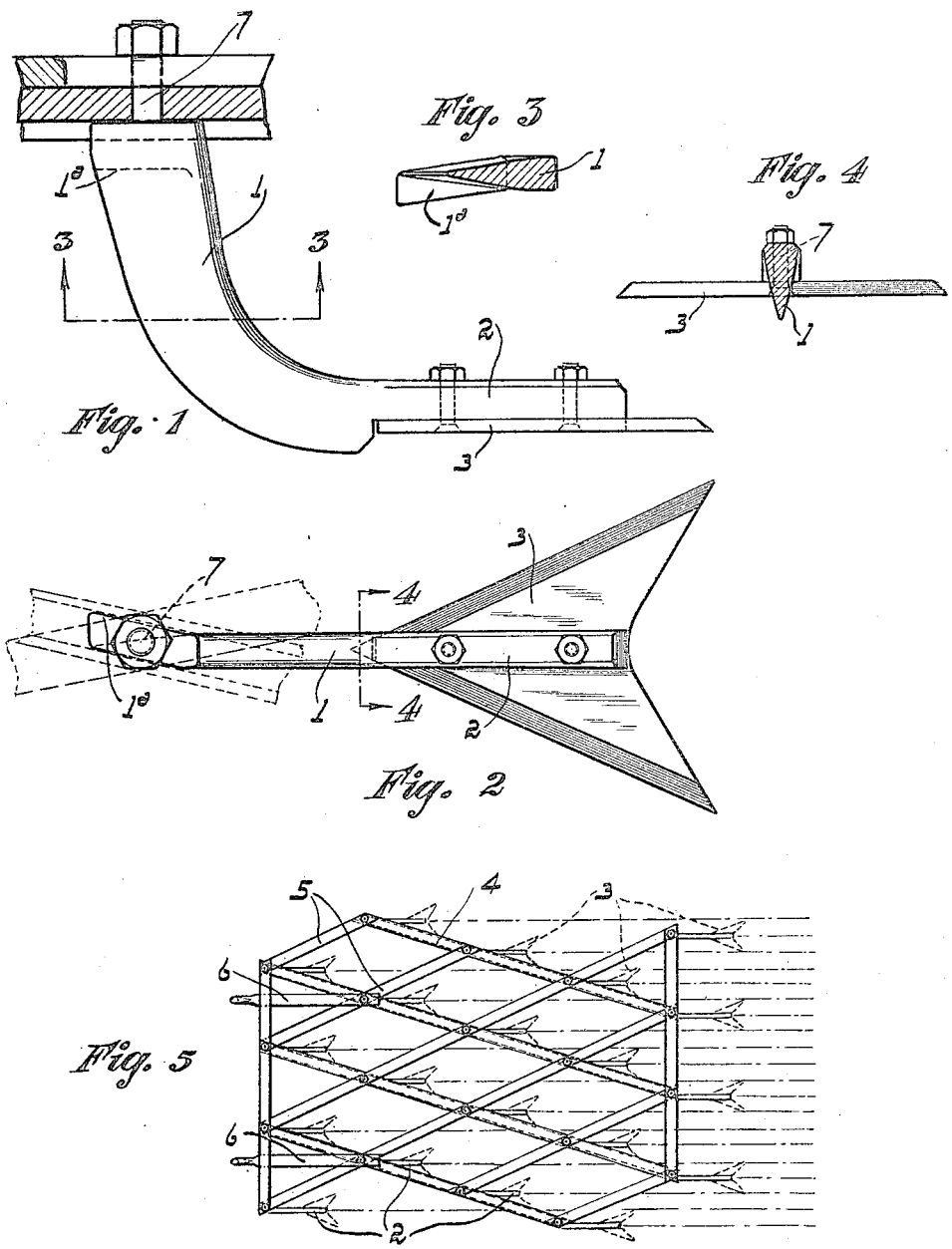

HENRY HUDSON SCOTT, OF STRASSBURG, SASKATCHEWAN, CANADA.

HARROW-TOOTH.

1,225,367.  Specification of Letters Patent.  Patented May 8, 1917.

Application filed June 11, 1915. Serial No. 33,436.

*To all whom it may concern:*

Be it known that I, HENRY HUDSON SCOTT, a subject of the King of Great Britain, residing at Strassburg, in the Province of Saskatchewan, Canada, have invented certain new and useful Improvements in Harrow-Teeth; and I do hereby declare that the following is a full, clear, and exact description of the invention, such as will enable others skilled in the art to which it appertains to make and use the same.

The invention to be hereinafter described relates to harrow teeth.

In order to more clearly disclose the construction, operation, and use of the invention, reference should be had to the accompanying drawings forming part of the present application. Throughout the several figures of the drawings like reference characters designate the same parts.

In the drawings:

Figure 1 is a side view of the tooth;

Fig. 2 is a top plan view;

Fig. 3 is a section on line 3—3 of Fig. 1 looking in the direction of the arrows;

Fig. 4 is a section on line 4—4 of Fig. 2 looking in the direction of the arrows; and Fig. 5 is a top plan view of a diamond harrow with my harrow teeth applied.

The main objects of the invention are to provide a strong and durable tooth which can be quickly and easily applied to any standard drag harrow and which will be specially adapted for summer fallow work. Further objects are to have this tooth so shaped and directed that it will open and aerate the soil without greatly disturbing it, and to provide a cutting plate for the tooth which will assist in this operation and will effectually kill all weeds. These and other objects are accomplished by the invention to be described.

Referring to the drawings in detail, the body portion 1 of the tooth is of tapered triangular form in cross section and is curved downwardly and backwardly, the apex of the triangle being directed forwardly and sharpened to form a cutting edge. The back lower portion of the tooth is cut away underneath to form a reduced horizontal integral attaching shank 2 to which is securely bolted a triangular fishtail cutting plate 3. The apex of this plate is directed forwardly and its sides are beveled downwardly and outwardly to form lateral cutting edges. This plate is somewhat above the lowest point of the cutting edge of the tooth, for a purpose to be later disclosed.

As will be noted from Figs. 1, 2, and 3, my tooth is provided, at its upper end, with an off set, angularly disposed, integral shoulder or block 1ª, and the opposite side of the top of the tooth is cut parallel therewith. This tooth is more specially adapted to be used with a light diamond harrow, such as that shown in Fig. 5, the body of which is composed of cross bulls 4 provided on their under faces with lateral ribs, and plain braces 5. The block 1ª and the angularly cut side of the top of the tooth are adapted to fit snugly on the under face of the bull in such a position as to clearly hold the body of the tooth parallel to the direction of the tractive force exercised on the harrow. This keeps the cutting edges of the teeth in a forward direction.

As the harrow is pulled forward, by any suitable means secured to the pull rods 6, the cutting edge of the tooth enters the soil which is effectually opened by the body of the tooth. Due to the fact that the cutting edge of the tooth extends below the plate 3, the plate readily enters the soil. As the harrow advances the soil which has been cut and opened by the body of the teeth is further loosened and aerated by the plate 3. In addition the cutting plate cuts the roots of any weeds and effectively kills the same.

The tooth is provided, at its upper end, with an integrally reduced and threaded post 7 which is adapted to be inserted through the alined bores in the bull and brace of the harrow and to receive a nut for securing purposes in the usual manner.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In a harrow tooth, a downwardly and backwardly curved body portion provided at one side of its upper end with an offset angularly disposed block and having the other side of its upper end cut at an angle parallel with the said block, an attaching shank integral with the said body portion formed by cutting away the under face of the back thereof, a triangular fishtail cutting plate detachably secured to the said shank, and securing means integral with the upper end of said body portion.

2. In a harrow tooth comprising a downwardly and backwardly curved body portion, said body portion being triangular in cross section having its apex directed forwardly and sharpened to form a cutting edge, a horizontal portion extending from said body portion, the lower face of said horizontal portion being cut away, and a triangular fishtail cutting plate secured to the lower face of said horizontal portion substantially as and for the purpose set forth.

In witness whereof I have hereunto set my hand in the presence of two witnesses.

HENRY HUDSON SCOTT.

Witnesses:
A. J. FALCONER,
SYDNEY L. A. SMYTH.

Copies of this patent may be obtained for five cents each, by addressing the "Commissioner of Patents, Washington, D. C."